(12) United States Patent
Watanabe

(10) Patent No.: US 11,303,692 B2
(45) Date of Patent: Apr. 12, 2022

(54) COMMUNICATION APPARATUS FOR TRANSMITTING RESPONSE, COMMUNICATION METHOD, AND STORAGE MEDIUM

(71) Applicant: CANON KABUSHIKI KAISHA, Tokyo (JP)

(72) Inventor: Ryo Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 16/201,355

(22) Filed: Nov. 27, 2018

(65) Prior Publication Data

US 2019/0166182 A1 May 30, 2019

(30) Foreign Application Priority Data

Nov. 30, 2017 (JP) .............................. JP2017-229878

(51) Int. Cl.
| | | |
|---|---|---|
| H04L 29/08 | (2006.01) | |
| H04L 29/06 | (2006.01) | |
| H04N 5/232 | (2006.01) | |
| H04L 67/02 | (2022.01) | |
| H04L 67/55 | (2022.01) | |
| H04L 67/01 | (2022.01) | |

(52) U.S. Cl.
CPC .............. *H04L 67/02* (2013.01); *H04L 67/26* (2013.01); *H04L 67/42* (2013.01); *H04N 5/23206* (2013.01)

(58) Field of Classification Search
CPC ......... H04L 67/02; H04L 67/26; H04L 67/42; H04L 29/0809; H04L 51/34; H04N 5/23206; G06F 17/30979; G06F 16/957
See application file for complete search history.

(56) References Cited

U.S. PATENT DOCUMENTS 10,592,322 B1 * 3/2020 Seshadri ............. G06F 11/3006
2005/0198190 A1 * 9/2005 Zavalkovsky .......... H04L 67/00
709/217
(Continued)

FOREIGN PATENT DOCUMENTS

JP     2012-227603 A    11/2012
JP     2013-210803 A    10/2013
(Continued)

OTHER PUBLICATIONS

Belshe et al., Hypertext Transfer Protocol Version 2 (HTTP/2), May 2015, Internet Engineering Task Force (IETF), RFC 7540, pp. 1-96. (Year: 2015).*

*Primary Examiner* — Muhammad Raza

(74) *Attorney, Agent, or Firm* — Canon U.S.A., Inc., I.P. Division

(57) ABSTRACT

A server apparatus receives, from a client apparatus, a Hypertext Transfer Protocol (HTTP) request for requesting the server apparatus to perform processing. The HTTP request includes identification information for identifying the requested processing. The server apparatus determines whether to transmit, during a period from reception of the HTTP request to transmission of a first response indicating completion of the processing requested by the HTTP request, a second response to the client apparatus. The determination is made based on the identification information included in the HTTP request.

9 Claims, 14 Drawing Sheets

(56) References Cited

U.S. PATENT DOCUMENTS

| | | | | |
|---|---|---|---|---|
| 2007/0016639 | A1* | 1/2007 | Mukundan | G06Q 10/06 709/203 |
| 2012/0281119 | A1* | 11/2012 | Ohba | G06T 3/40 348/240.2 |
| 2016/0226946 | A1* | 8/2016 | Karaatanassov | H04L 67/02 |
| 2019/0166182 | A1* | 5/2019 | Watanabe | H04N 5/23206 |

FOREIGN PATENT DOCUMENTS

| | | |
|---|---|---|
| JP | 2015-120300 A | 7/2015 |
| JP | 2016-218923 A | 12/2016 |
| JP | 2017-038297 A | 2/2017 |

* cited by examiner

FIG.5

| NO | URL | METHOD | MEANING |
|---|---|---|---|
| 501 | http://xxx/takePic | POST | CONTINUOUS IMAGE CAPTURING |
| 502 | http://xxx/zoom | POST | OPTICAL ZOOM |
| 503 | http://xxx/rec | POST | RECORDING |

FIG.12

| NO | URL | METHOD | MEANING |
|---|---|---|---|
| 1201 | http://xxx/1.mpg | GET | TRANSMISSION OF MOVING IMAGE 1.mpg |
| 1202 | http://xxx/del | POST | DELETION OF MOVING IMAGE |

COMMUNICATION APPARATUS FOR TRANSMITTING RESPONSE, COMMUNICATION METHOD, AND STORAGE MEDIUM

BACKGROUND OF THE INVENTION

Field of the Invention

The present disclosure relates to a system in which a request and a response are transmitted and received among a plurality of communication apparatuses.

Description of the Related Art

As one of configurations for providing services on a network, there is known a configuration in which a server receives a request transmitted from a client and executes processing in response to the request. Communication between a server and a client may use a Hypertext Transfer Protocol (HTTP) technique. For example, the client transmits an HTTP request to the server, thereby requesting the server to perform processing. The server transmits an HTTP response after executing the processing in response to the request, thereby notifying the client of completion of the processing.

Depending on content of the processing requested by the HTTP request, a period from reception of a request by the server to transmission of a response by the server may be long. Japanese Patent Application Laid-Open No. 2013-210803 discusses a technique in which, when a request for a result of processing is received from a client while a server is executing the processing requiring a long period of time, a response indicating that the request is temporarily not acceptable is transmitted before completion of the processing.

If it takes a long time from the reception of a request by the server to the transmission of a response thereby, the client needs to wait for a long period of time until receiving the response in a state where the client cannot determine whether the server is executing processing or the request has not been correctly received by the server. Accordingly, in a case where the request has not been correctly received by the server, the client may be uselessly waiting for the request, which may lead to an increase in a delay of processing in the system. In addition, if the server is actually executing the processing when the client has determined that the request has not been received by the server and has transmitted the request again, the server repeatedly executes the processing in response to the request, thereby leading to an increase in a processing load on the server.

In the technique discussed in Japanese Patent Application Laid-Open No. 2013-210803, the client transmits a request to the server to request for a processing result so that the client can check whether the processing is being executed by the server. However, in order to promptly determine that the processing is completed by the server, the client may need to repeatedly transmit the request until receiving the response indicating the completion of the processing. This may lead to an increase in a processing load on the client.

SUMMARY OF THE INVENTION

Various embodiments of the present disclosure are directed to enabling a client to promptly determine that a request transmitted from the client has been received by a server and the server has completed the processing associated with the request, while suppressing an increase in a processing load on the client.

According to one embodiment of the present disclosure, a communication apparatus that performs communication in accordance with Hypertext Transfer Protocol (HTTP) includes a reception unit configured to receive, from another communication apparatus that is different from the communication apparatus, an HTTP request for requesting the communication apparatus to perform processing, the HTTP request including identification information for identifying the requested processing, a determination unit configured to determine, based on the identification information included in the HTTP request, whether to transmit, during a period from reception of the HTTP request by the reception unit to transmission of a first response indicating completion of the processing requested by the HTTP request, a second response to the other communication apparatus, and a transmission unit configured to transmit, to the other communication apparatus, the first response and the second response based on the determination made by the determination unit.

Further features will become apparent from the following description of exemplary embodiments with reference to the attached drawings.

BRIEF DESCRIPTION OF THE DRAWINGS

FIG. 5 is a table illustrating an example of information held by an information holding unit according to one embodiment.

FIG. 12 is a table illustrating an example of information held by the information holding unit according to one embodiment.

DESCRIPTION OF THE EMBODIMENTS

<System Configuration>

Figure 1:
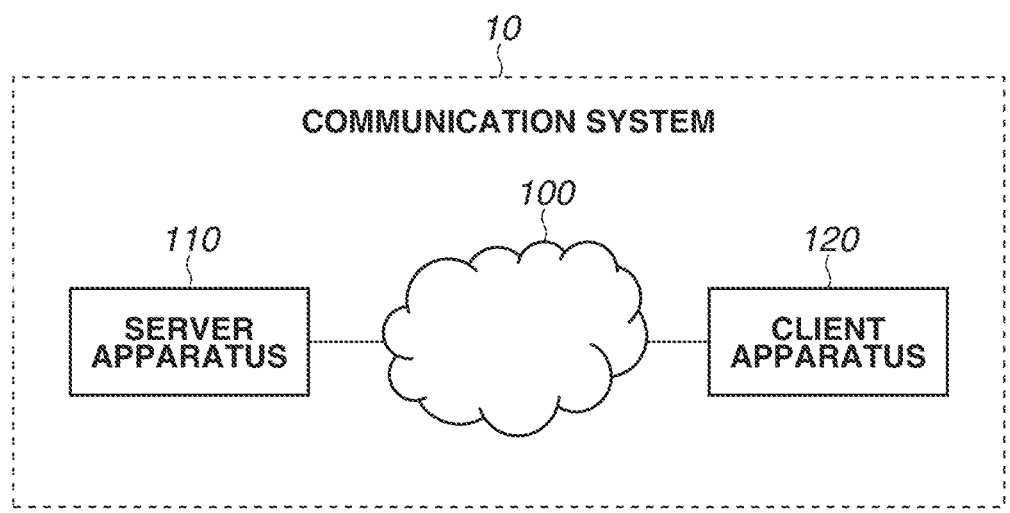
FIG. 1 is a block diagram illustrating a configuration example of a communication system according to one embodiment.

An exemplary embodiment will be described below with reference to the drawings. FIG. 1 illustrates a configuration of a communication system 10 according to the present exemplary embodiment. In the communication system 10 according to the present exemplary embodiment, a server apparatus 110 and a client apparatus 120 are connected via a network 100 through a wired or wireless connection. The server apparatus 110 and the client apparatus 120 communicate with each other to transmit or receive content data such as a still image and a moving image, various commands for operation instructions, and the like. In the communication system 10 illustrated in FIG. 1, one server apparatus 110 and one client apparatus 120 are connected. However, the connection configuration is not limited thereto. For example, one server apparatus 110 and a plurality of client apparatuses 120 may be connected, or a plurality of server apparatuses 110 and one client apparatus 120 may be connected. Furthermore, a plurality of server apparatuses 110 and a plurality of client apparatuses 120 may be connected.

The network 100 is a network through which the server apparatus 110 and the client apparatus 120 are connected. The network 100 according to the present exemplary embodiment is implemented by, for example, the Internet, a wide area network (WAN), a local area network (LAN), or a combination thereof. The server apparatus 110 and the client apparatus 120 may also be connected directly without using the network 100. The direct connection is implemented by using, for example, a wireless ad hoc network.

The server apparatus 110 operates as a server of Hypertext Transfer Protocol (HTTP). More specifically, the server apparatus 110 receives an HTTP request from the client apparatus 120 and transmits an HTTP response to the client apparatus 120 in response to the received request. The client apparatus 120 operates as a client of HTTP. More specifically, the client apparatus 120 transmits an HTTP request to the server apparatus 110 and receives an HTTP response transmitted from the server apparatus 110. Specific examples of the server apparatus 110 and the client apparatus 120 include a digital camera, a network camera, a printer, a multifunction peripheral, a television set, a projector, a mobile phone, a smartphone, and a personal computer (PC). For example, a smartphone serving as the client apparatus 120 requests a network camera serving as the server apparatus 110 to perform processing such as pan/tilt control and capturing of a moving image by using an HTTP request. When the network camera serving as the server apparatus 110 receives the HTTP request, the network camera executes processing in response to the request and transmits an HTTP response indicating completion of the processing to the smartphone serving as the client apparatus 120. By receiving the HTTP response, the smartphone can recognize the completion of the processing and can request, for example, for subsequent processing based on a processing result. However, the configurations of the server apparatus 110 and the client apparatus 120 are not limited to these examples.

If the processing executed by the server apparatus 110 takes a long time, the client apparatus 120 needs to wait for a long period of time from transmission of the request to reception of the response. If the response is not received for a long period of time, the client apparatus 120 cannot determine whether the server apparatus 110 is executing the processing or the request has not correctly reached the server apparatus 110. Accordingly, the client apparatus 120 transmits, to the server apparatus 110, a new inquiry for checking whether the request has correctly reached the server apparatus 110, so that the client apparatus 120 can check a request reception status. In this method, however, the client apparatus 120 performs extra communication that may lead to an increase in a processing load on the client apparatus 120 or an increase in a load on the network 100. In particular, if a user operation is required for transmitting the inquiry, the time and labor required for a user may also increase.

Accordingly, in the present exemplary embodiment, the server apparatus 110 transmits a temporary response to the client apparatus 120 during a period from the reception of an HTTP request to the transmission of a response indicating completion of processing requested by the HTTP request. This configuration enables the client apparatus 120 to easily determine the request reception status in the server apparatus 110. If the client apparatus 120 can determine that the server apparatus 110 has received the request and is executing the processing, the client apparatus 120 can wait for a response indicating completion of the processing without transmitting a new inquiry, whereby efficient communication can be achieved. If the client apparatus 120 can determine that the server apparatus 110 has not received the request, the client apparatus 120 can transmit the HTTP request again without transmitting a new inquiry, whereby a delay in starting the processing by the server apparatus 110 can be reduced.

<Apparatus Configuration>

Figure 14:
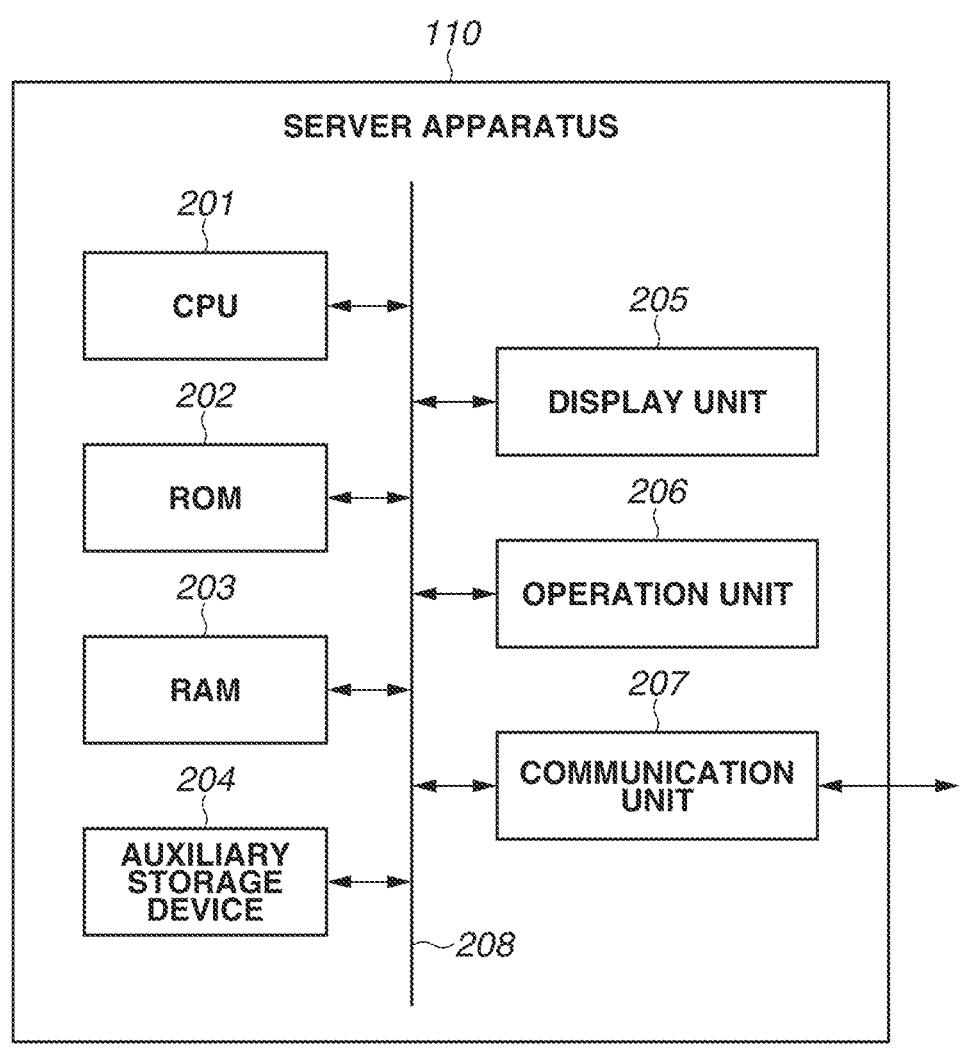
FIG. 14 is a block diagram illustrating a hardware configuration example of the server apparatus according to one embodiment.

FIG. 14 is a block diagram illustrating a hardware configuration of the server apparatus 110. A configuration of the client apparatus 120 is similar to that of the server apparatus 110. The server apparatus 110 includes a central processing unit (CPU) 201, a read-only memory (ROM) 202, a random access memory (RAM) 203, an auxiliary storage device 204, a display unit 205, an operation unit 206, a communication unit 207, and a bus 208.

The CPU 201 controls the entire server apparatus 110 using a computer program and data stored in the ROM 202 and the RAM 203. The ROM 202 stores a program and a parameter that do not require any change. The RAM 203 temporarily stores a program and data supplied from the auxiliary storage device 204, and data and the like supplied from an external apparatus via the communication unit 207. The auxiliary storage device 204 includes, for example, a hard disk drive and stores content data such as a still image and a moving image.

The display unit 205 includes, for example, a liquid crystal display and a light emitting diode (LED), and displays a graphical user interface (GUI) used by the user to operate the server apparatus 110, error information, and the like. The operation unit 206 includes, for example, a keyboard, a mouse, and a touch panel. The operation unit 206 receives an operation from the user and inputs various instructions to the CPU 201. The communication unit 207 communicates with an external apparatus such as the client apparatus 120. If the server apparatus 110 is connected with the external apparatus through a wired connection, for example, a LAN cable or the like is connected to the communication unit 207. If the server apparatus 110 has a function of performing wireless communication with the external apparatus, the communication unit 207 includes an antenna or the like. The bus 208 connects the units of the server apparatus 110 to transmit information therebetween.

In the present exemplary embodiment, the CPU 201 executes a program to control the communication between the server apparatus 110 and the external apparatus via the communication unit 207. However, at least a part of the communication between the server apparatus 110 and the external apparatus may be controlled by the communication unit 207 in hardware processing. In the present exemplary embodiment, the display unit 205 and the operation unit 206 are present inside the server apparatus 110. However, at least one of the display unit 205 and the operation unit 206 may be present outside the server apparatus 110 as a separate apparatus. In this case, the CPU 201 operates as a display control unit for controlling the display unit 205 and as an operation control unit for controlling the operation unit 206. The server apparatus 110 may include a component other than the components illustrated in FIG. 2. For example, if the server apparatus 110 is a network camera, the server apparatus 110 may include an imaging unit (not illustrated) that includes a lens and an imaging sensor.

Figure 2:
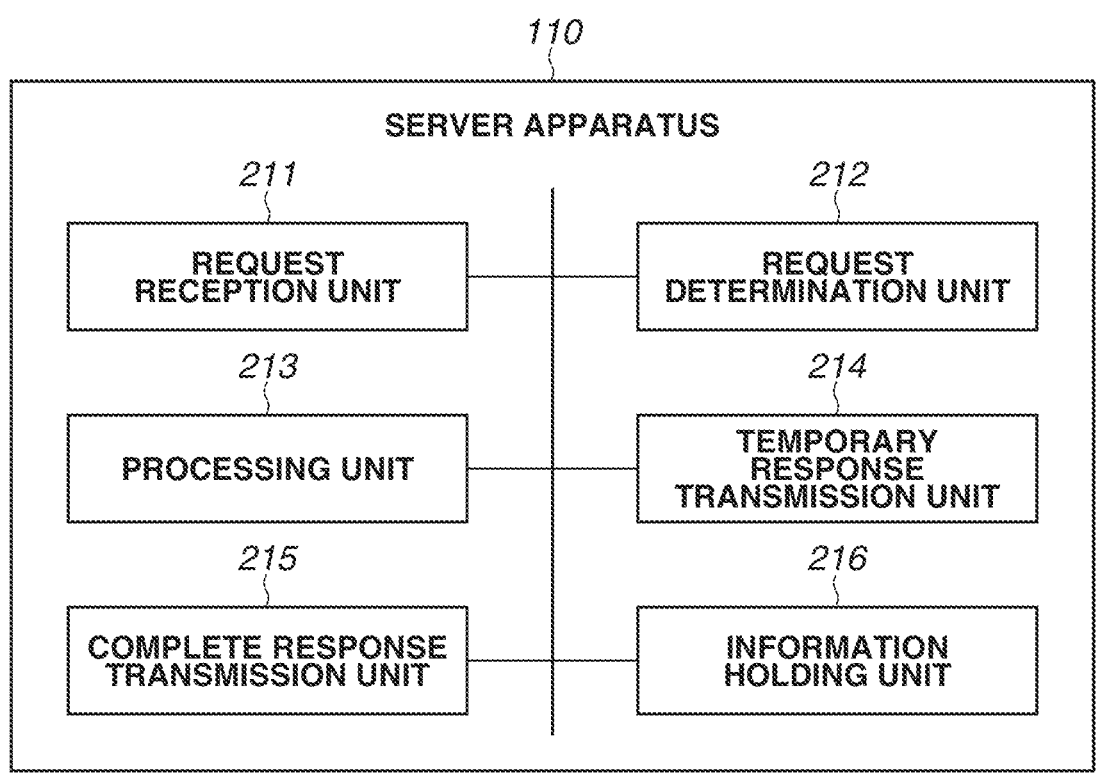
FIG. 2 is a block diagram illustrating a functional configuration example of a server apparatus according to one embodiment.

FIG. 2 illustrates a functional configuration example of the server apparatus 110. Each functional unit of the server apparatus 110 illustrated in FIG. 2 is implemented in such a manner that the CPU 201 of the server apparatus 110 executes the program stored in the ROM 202 and the RAM 203 to control the auxiliary storage device 204, the communication unit 207, and the like. A request reception unit 211 receives a request transmitted from the client apparatus 120. A request determination unit 212 determines whether the request received by the request reception unit 211 includes predetermined identification information held by an information holding unit 216. The identification information will be described in detail below with reference to FIG. 5 and the like. A processing unit 213 executes various types of processing such as processing requested by the request received by the request reception unit 211 corresponding to functions provided to the server apparatus 110. A temporary response transmission unit 214 transmits a temporary response in response to the request received by the request reception unit 211. A complete response transmission unit 215 transmits a complete response indicating completion of processing in response to the request received by the request reception unit 211. The information holding unit 216 preliminarily acquires and holds the predetermined identification information.

Figure 3:
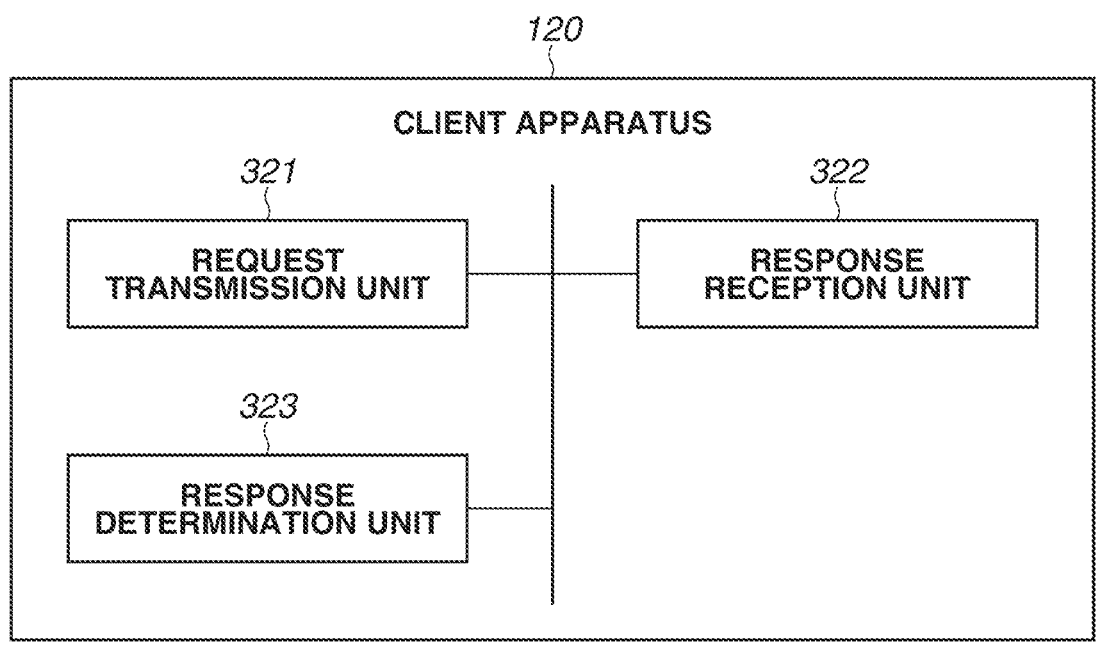
FIG. 3 is a block diagram illustrating a functional configuration example of a client apparatus according to one embodiment.

FIG. 3 illustrates a functional configuration example of the client apparatus 120. Each functional unit of the client apparatus 120 illustrated in FIG. 3 is implemented in such a manner that the CPU 201 of the client apparatus 120 executes the program stored in the ROM 202 and the RAM 203 to control the auxiliary storage device 204, the communication unit 207, and the like. A request transmission unit 321 transmits an HTTP request to the server apparatus 110. A response reception unit 322 receives a response transmitted from the server apparatus 110 in response to the request transmitted by the request transmission unit 321. A response determination unit 323 determines whether the response received by the response reception unit 322 corresponds to the temporary response.

<Operation Flow>

Figure 4:
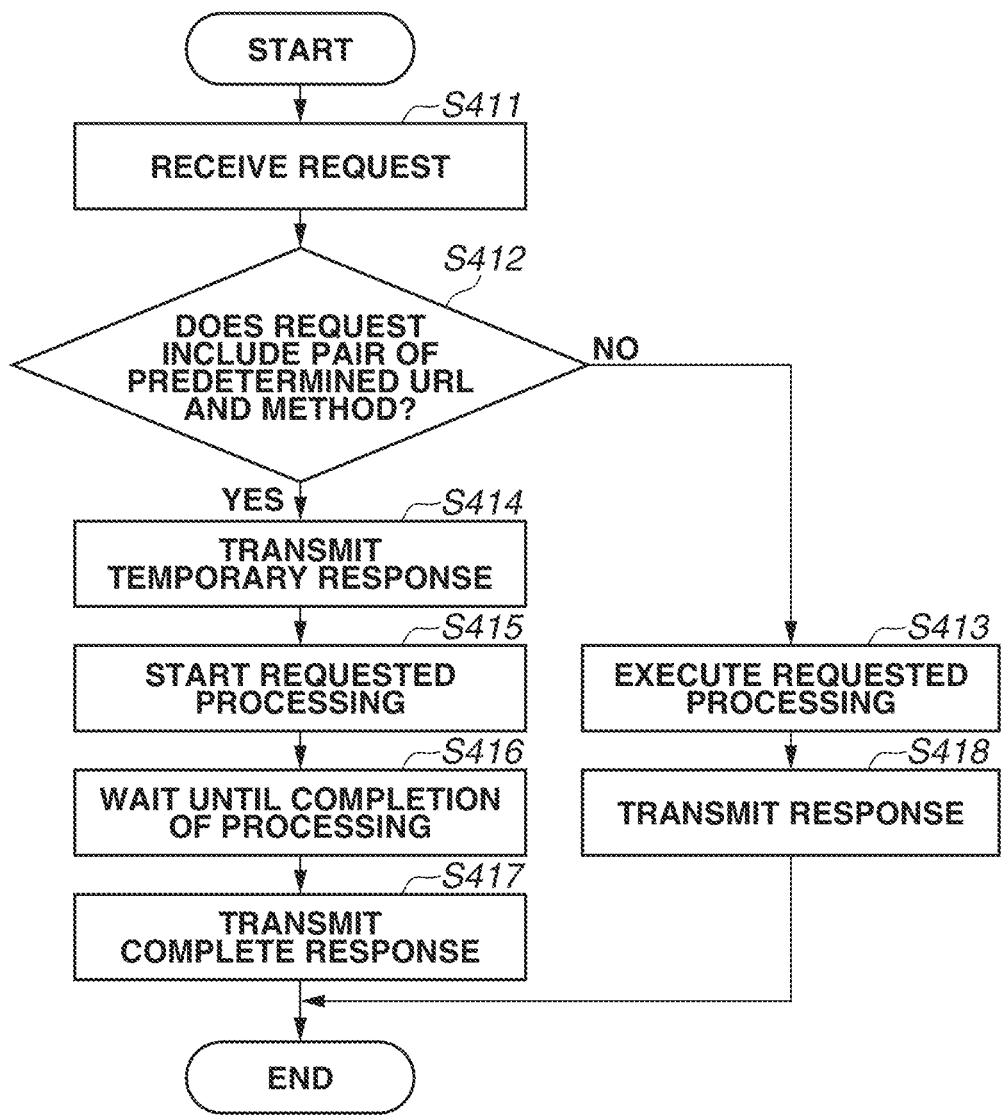
FIG. 4 is a flowchart illustrating an operation of the server apparatus according to one embodiment.

Next, an operation flow of each of the server apparatus 110 and the client apparatus 120 will be described. FIG. 4 is a flowchart illustrating an operation of the server apparatus 110 in HTTP communication with the client apparatus 120. Processing illustrated in FIG. 4 is implemented in such a manner that the CPU 201 of the server apparatus 110 loads a program stored in the ROM 202 to the RAM 203 and executes the program. At least a part of the processing described below may be implemented by dedicated hardware other than the CPU 201. The processing illustrated in FIG. 4 is started at a timing when a connection such as an HTTP connection is established between the server apparatus 110 and the client apparatus 120, and is executed each time the server apparatus 110 receives an HTTP request from the client apparatus 120. The timing of starting the processing illustrated in FIG. 4 is not limited thereto.

In step S411, the request reception unit 211 receives, from the client apparatus 120, an HTTP request for requesting the server apparatus 110 to perform processing. The HTTP request received at this time includes identification information for identifying the requested processing. In step S412, the request determination unit 212 analyzes the HTTP request received in step S411, and determines whether the identification information included in the HTTP request matches the predetermined identification information held by the information holding unit 216. More specifically, if the HTTP request includes information indicating a predetermined Uniform Resource Locator (URL) and a method, it is determined that the identification information matches the predetermined identification information (YES in step S412), and the processing proceeds to step S414. If the processing proceeds to step S414, as described below, a temporary response is transmitted from the server apparatus 110 to the client apparatus 120 in this operation flow. On the other hand, if the HTTP request does not include information indicating a predetermined URL and a method, it is determined that the identification information does not match the predetermined identification information (NO in step S412), and the processing proceeds to step S413. If the processing proceeds to step S413, as described below, the temporary response is not transmitted from the server apparatus 110 to the client apparatus 120 in this operation flow. The predetermined identification information will be described in detail below with reference to FIG. 5.

In the present exemplary embodiment, the HTTP request including information indicating a predetermined URL and a method is a request for requesting processing requiring a long period of time. Examples of the processing requiring a long period of time include processing of continuously capturing still images by an image capturing unit included in the server apparatus 110, processing of capturing moving images, processing of converting the captured images, and processing of changing a zoom factor or a direction (pan and tilt) of image capturing by the image capturing unit.

If the server apparatus 110 receives the HTTP request including identification information for requesting the processing requiring a long period of time, the server apparatus 110 transmits the temporary response to the client apparatus 120 in the subsequent processing so as to notify the client apparatus 120 of reception of the request. On the other hand, if the server apparatus 110 has received the HTTP request including identification information for requesting processing that can be completed in a short period of time, the client apparatus 120 does not wait for a long period of time to receive a response indicating completion of the processing. Accordingly, the server apparatus 110 does not transmit the temporary response. Thus, the server apparatus 110 determines whether to transmit the temporary response to the client apparatus 120 based on the identification information included in the received HTTP request. Consequently, a processing load on the server apparatus 110 and an amount of communication data in the network 100 can be reduced as compared with a case where the temporary response is transmitted in response to every HTTP request received by the server apparatus 110.

A criterion for determining whether the server apparatus 110 transmits the temporary response is not limited to whether the identification information included in the received HTTP request matches the predetermined identification information held by the information holding unit 216. For example, even when the identification information does not match the predetermined identification information, the server apparatus 110 may determine to transmit the temporary response if a delay is expected in transmitting the complete response due to, for example, the server apparatus 110 executing another processing. For example, even when the identification information matches the predetermined identification information, the server apparatus 110 may determine not to transmit the temporary response if the complete response can be immediately transmitted due to a reason such as the requested processing has already been executed.

In step S413, the processing unit 213 executes the processing requested by the request received from the client apparatus 120. In step S418, the complete response transmission unit 215 transmits, to the client apparatus 120, the HTTP response indicating completion of the requested processing. If the processing requested by the request is processing of transmitting a response only, step S413 is omitted and a response is transmitted in step S418. After the processing of step S418 is executed, the processing illustrated in FIG. 4 is terminated. In this way, if it is determined that the temporary response is not transmitted to the client apparatus 120, the server apparatus 110 transmits the complete response to the client apparatus 120 without transmitting the temporary response. Accordingly, the client apparatus 120 can recognize that the HTTP request is processed by the server apparatus 110 based on reception of the complete response while reducing the processing load on the server apparatus 110 in association with the transmission of the temporary response.

In step S414, the temporary response transmission unit 214 transmits the temporary response to the client apparatus 120 in response to the reception of the HTTP request in step S411. The temporary response is, for example, an HTTP response including a status code of 100 Continue. However, content of the temporary response is not limited thereto. In step S415, the processing unit 213 starts processing requested by the request received from the client apparatus 120. Steps S414 and S415 may be reversed.

In step S416, the complete response transmission unit 215 waits until completion of the processing started in step S415. In a case where it is determined that a communication session between the server apparatus 110 and the client apparatus 120 is not alive before the completion of the processing requested by the HTTP request, the processing unit 213 may interrupt the processing being executed. The case where it is determined that the communication session is not alive refers to, for example, a case where a Transmission Control Protocol (TCP) connection is disconnected. In addition, the processing unit 213 may also interrupt the processing being executed in a case where the client apparatus 120 transmits, to the server apparatus 110, a request for cancelling the transmitted request before the completion of the requested processing.

In step S417, the complete response transmission unit 215 transmits, to the client apparatus 120, the complete response indicating the completion of the processing in response to the request received from the client apparatus 120. The complete response is, for example, an HTTP response including a status code of 200 OK. The complete response may include information indicating a processing result and the like in addition to the information indicating the completion of the processing. Content of the complete response is not limited thereto. For example, a response including another status code may be transmitted depending on content of a request, a state of the server apparatus 110, a processing result, and the like as the complete response. If the processing requested by the server apparatus 110 is interrupted, an error response including a status code such as 406 Not Acceptable and 408 Request timeout is transmitted instead of the complete response. Thus, the processing illustrated in FIG. 4 is terminated.

The predetermined identification information held by the information holding unit 216 that is associated with determination processing in step S412 will now be described with reference to FIG. 5. In the present exemplary embodiment, the HTTP request transmitted from the client apparatus 120 includes information indicating a method of the HTTP request and a URL for determining content of processing requested by the HTTP request. The information holding unit 216 holds, as the predetermined identification information, a pair of a predetermined URL and information indicating a method of the HTTP request among the pieces of information each indicating a URL and a method that can be included in the HTTP request. However, the predetermined identification information is not limited thereto. The identification information may be represented by either one of the URL and the method or represented by a Uniform Resource Identifier (URI) instead of the URL. Information in another format may also be used as the identification information as long as the information can be used to identify the type or the content of the processing requested by the HTTP request.

Identification information in an entry 501 is represented by a URL of http://xxx/takePic and information indicating a POST method. More specifically, if the HTTP request analyzed in step S412 is a POST method request that includes the URL of http://xxx/takePic, a determination result in step S412 becomes "YES". The identification information in the entry 501 indicates continuous image capturing. The URL included in the HTTP request may include query information at the end of the URL. For example, if the HTTP request transmitted from the client apparatus 120 is a request for continuously capturing five images by the server apparatus 110, the HTTP request includes a URL of http://xxx/takePic?num=5. In this case as well, it is determined that the HTTP request includes information that matches the identification information in the entry 501.

Identification information in an entry 502 corresponds to a request for requesting optical zoom of the imaging unit included in the server apparatus 110. For example, an HTTP request for requesting optical zoom of 200% includes a URL of http://xxx/zoom?rate=200 and information indicating the POST method. An entry 503 corresponds to a request for requesting recording of a moving image by the server apparatus 110. For example, an HTTP request for requesting recording of a moving image of 10 seconds includes a URL of http://xxx/rec?time=10 and information indicating the POST method.

In the present exemplary embodiment, the predetermined identification information held by the information holding unit 216 is identification information corresponding to processing requiring a period of time longer than a predetermined time length. More specifically, the server apparatus 110 receives a user operation or an instruction from the client apparatus 120 to designate the predetermined time length, and holds, in the information holding unit 216, identification information corresponding to processing requiring a period of time longer than the designated time length among processing executable by the server apparatus 110. The method for determining the predetermined identification information held by the information holding unit 216 is not limited thereto. For example, the content of the processing or the identification information itself may be designated by the user operation or the instruction from the client apparatus 120, and the server apparatus 110 may hold the identification information corresponding to the designation in the information holding unit 216. Further, the server apparatus 110 may automatically determine and update the information to be held by the information holding unit 216 based on an operation mode of the server apparatus 110 or the content of the processing being executed. Each example of the predetermined identification information illustrated in FIG. 5 is in the POST method. However, the predetermined identification information is not limited thereto. The identification information corresponding to a method such as PUT or NOTIFY may also be held by the information holding unit 216.

Figure 6:
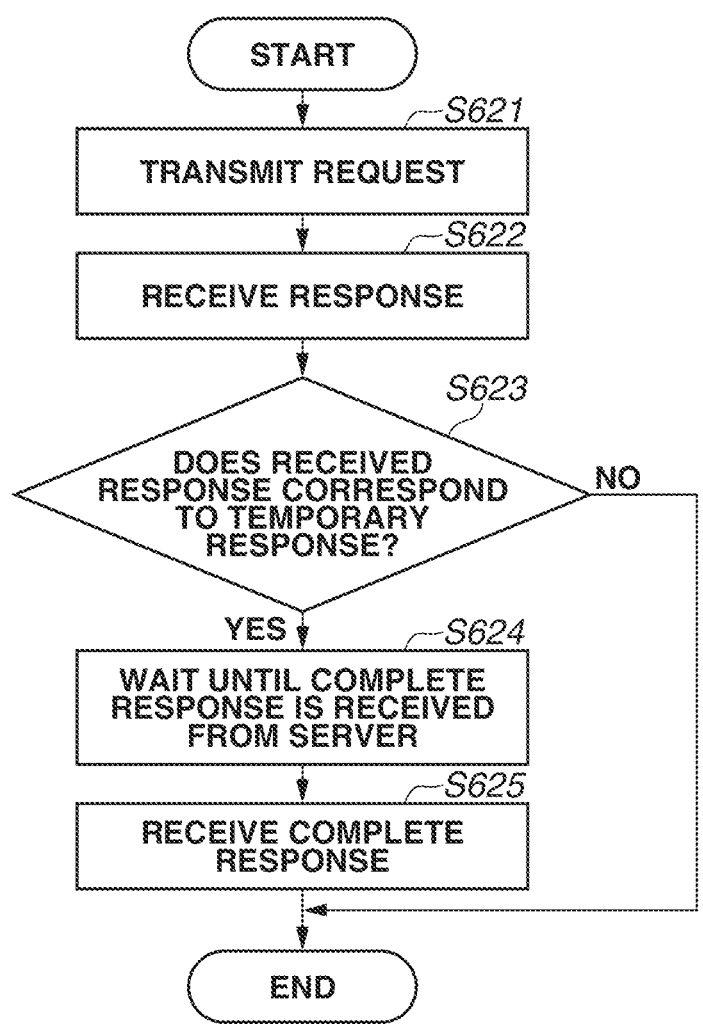
FIG. 6 is a flowchart illustrating an operation of the client apparatus according to one embodiment.

Next, an operation flow of the client apparatus 120 will be described with reference to FIG. 6. Processing illustrated in FIG. 6 is implemented in such a manner that the CPU 201 of the client apparatus 120 loads a program stored in the ROM 202 to the RAM 203 and executes the program. At least a part of the processing described below may be implemented by dedicated hardware other than the CPU 201. The processing illustrated in FIG. 6 is started at a timing when a connection such as an HTTP connection is established between the server apparatus 110 and the client apparatus 120, and is executed each time an event occurs in which an HTTP request is to be transmitted from the client apparatus 120 to the server apparatus 110. However, the timing for starting the processing illustrated in FIG. 6 is not limited thereto.

In step S621, the request transmission unit 321 transmits an HTTP request to the server apparatus 110. In step S622, the response reception unit 322 receives a response from the server apparatus 110. The client apparatus 120 that has received the response may inform, by display or sound, the user who operates the client apparatus 120 that the response is received from the server apparatus 110, i.e., the HTTP request is received by the server apparatus 110. In step S623, the response determination unit 323 determines whether the response received in step S622 corresponds to a temporary response. For example, if the received response includes the status code of 100 Continue, the determination result in step S623 becomes "YES", and the processing proceeds to step S624. On the other hand, if the received response does not include the status code of 100 Continue, the processing illustrated in FIG. 6 is terminated.

In step S624, the response reception unit 322 waits until the complete response is received from the server apparatus 110. In step S625, the response reception unit 322 receives the complete response transmitted from the server apparatus 110. If the error response is transmitted instead of the complete response from the server apparatus 110, in step S625, the response reception unit 322 receives the error response. Thus, the processing illustrated in FIG. 6 is terminated.

<Communication Sequence>

Figure 7:
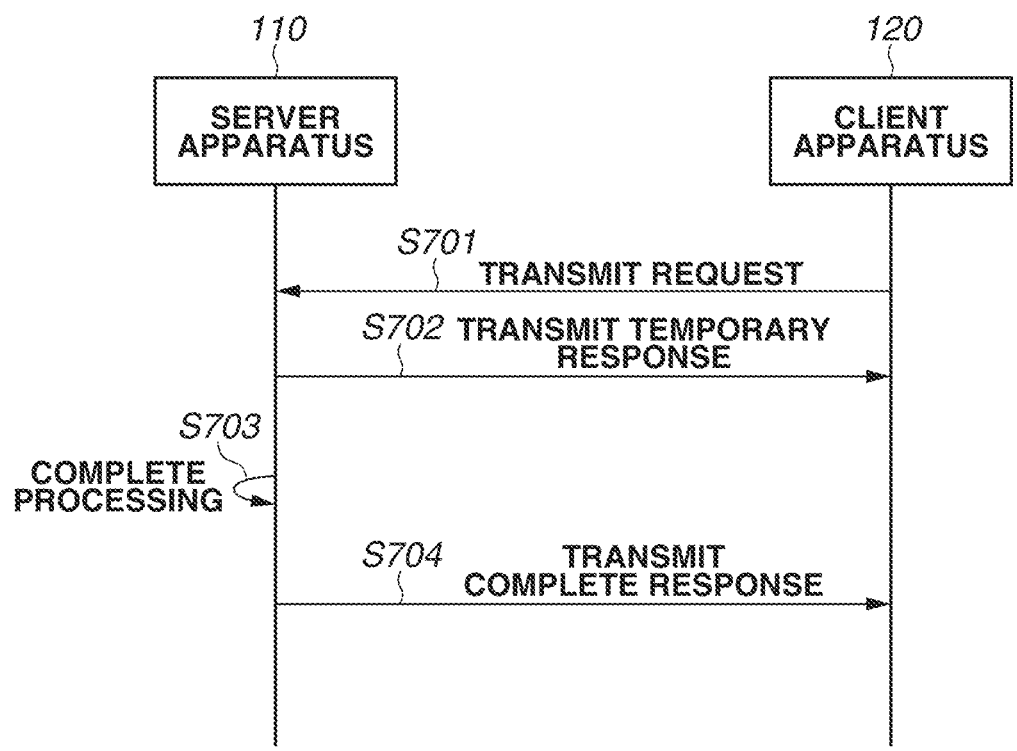
FIG. 7 is a sequence diagram illustrating an example of a sequence for communication between the server apparatus and the client apparatus according to one embodiment.

FIG. 7 illustrates an example of a communication sequence to be executed in the communication system 10. The server apparatus 110 and the client apparatus 120 execute the operations described above with reference to FIGS. 4 and 6, thereby implementing the communication sequence illustrated in FIG. 7. In step S701, the request transmission unit 321 of the client apparatus 120 transmits an HTTP request, and the request reception unit 211 of the server apparatus 110 receives the HTTP request. The HTTP request transmitted at this time includes the predetermined identification information held by the information holding unit 216 illustrated in FIG. 5.

In step S702, the request determination unit 212 of the server apparatus 110 determines that the request includes the predetermined identification information, and the temporary response transmission unit 214 transmits a temporary response to the received request. The response reception unit 322 of the client apparatus 120 receives the transmitted response, and the response determination unit 323 determines that the response corresponds to the temporary response.

In step S703, the processing unit 213 of the server apparatus 110 completes the processing requested by the request. In step S704, the complete response transmission unit 215 of the server apparatus 110 transmits the complete response, and the response reception unit 322 of the client apparatus 120 receives the response. The server apparatus 110 may transmit the complete response after completion of processing requested by the HTTP request, or transmission of the complete response may be a part or the whole of the requested processing. If the server apparatus 110 determines that the requested processing can be normally completed, the server apparatus 110 may transmit the complete response before the completion of the processing. The number of transmissions of the temporary response in step S702 is not limited to one. For example, the server apparatus 110 may transmit the temporary response every given period during a period from the reception of the HTTP request in step S701 to the transmission of the complete response in step S704.

In this manner, by receiving the temporary response in step S702, the client apparatus 120 can determine that the HTTP request transmitted in step S701 is received by the server apparatus 110. Accordingly, the client apparatus 120 waits for a response from the server apparatus 110 without performing extra communication or the like to check whether the request has been correctly received. In step S704, by receiving the complete response, the client apparatus 120 can determine that the processing requested by the HTTP request transmitted in step S701 is completed by the server apparatus 110.

The temporary response transmitted in step S702 is, for example, the HTTP response including the status code of 100 Continue. The complete response transmitted in step S704 is, for example, the HTTP response including the status code of 200 OK. However, the contents of the temporary response and the complete response are not limited thereto. For example, the server apparatus 110 may transmit an HTTP response including any of status codes 100 to 199 as the temporary response and may transmit an HTTP response including any of status codes 200 to 599 as the complete response. At this time, the status codes 100 to 199 each indicate that a request is received and processing is continued. On the other hand, the status codes 200 to 599 each indicate that the requested processing is completed, additional processing for completing the requested processing is required, or an error has occurred in the content of the request or the requested processing.

As another example, the server apparatus 110 may transmit a part of the HTTP response as the temporary response and may transmit the remaining part of the HTTP response as the complete response. More specifically, the server apparatus 110 may transmit a status line and a header of the HTTP response including the status code of 200 OK as the temporary response, and may transmit a body of the HTTP response as the complete response. The temporary response may also include a part of the body of the HTTP response, or may include only the status line of the HTTP response.

Using the method described above, the same effects as those obtained when the temporary response and the complete response are transmitted as other HTTP responses can be obtained. More specifically, the client apparatus 120 can determine that the HTTP request has been received by the server apparatus 110 by receiving the status line and the header of the HTTP response. Further, the client apparatus 120 can determine that the processing requested by the HTTP request is completed by the server apparatus 110 by receiving the body of the HTTP response. Using the method described above, the amount of data communication in the communication system 10 can be reduced as compared with a case where the temporary response and the complete response are transmitted as independent HTTP responses.

Figure 8:
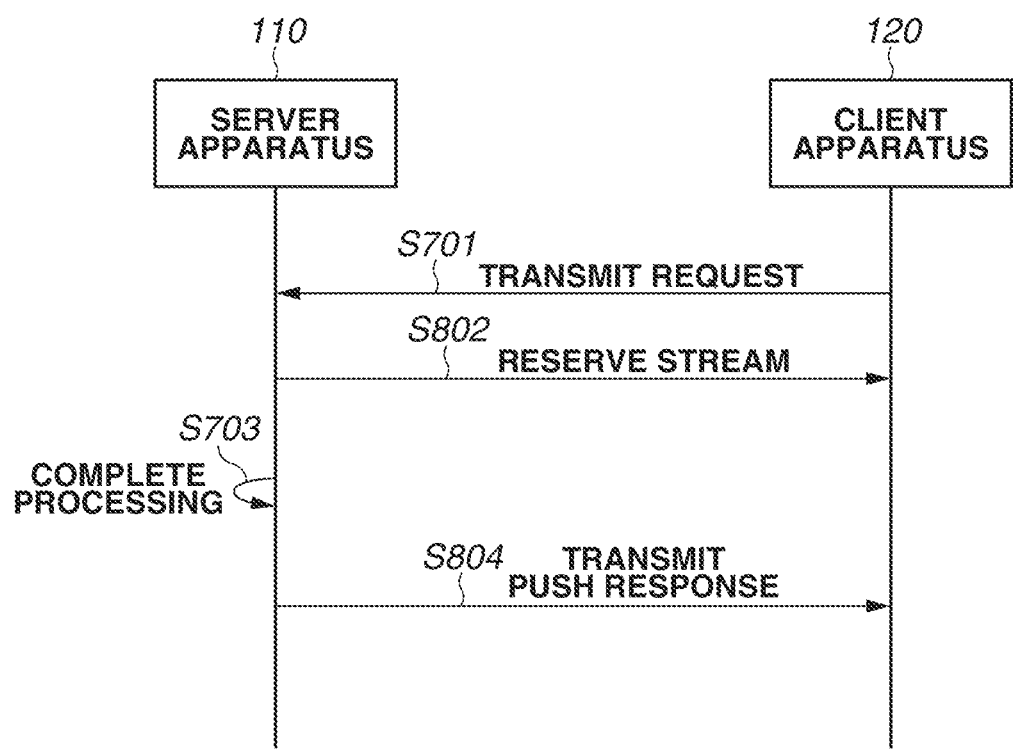
FIG. 8 is a sequence diagram illustrating an example of a sequence for communication between the server apparatus and the client apparatus according to one embodiment.

FIG. 8 illustrates an example of a communication sequence in a case where a stream reservation request is transmitted from the server apparatus 110 to the client apparatus 120 as the temporary response, and a push response using a reserved stream is transmitted as the complete response. Processes similar to the processes in the sequence described above with reference to FIG. 7 are denoted by the same reference symbols.

In Hypertext Transfer Protocol version 2 (HTTP/2), which is a communication standard based on HTTP, a PUSH_PROMISE frame is defined as data that can be transmitted from a server. The server transmits the PUSH_PROMISE frame to a client to request a reservation of a stream, which is a logical connection. The server can push data to the client at any timing using the reserved stream without waiting for a new request from the client. Thus, Server Push, which is push-type data transmission from the server to the client, is implemented.

The temporary response and the complete response according to the present exemplary embodiment can be implemented by using the function as defined in HTTP/2. In step S802 of the communication sequence illustrated in FIG. 8, the server apparatus 110 transmits the temporary response including the PUSH_PROMISE frame in response to the reception of the HTTP request from the client apparatus 120 in step S701. The PUSH_PROMISE frame transmitted at this time includes the number of a stream to be reserved. In step S804, the server apparatus 110 transmits a push response to the client apparatus 120 in response to the completion of the processing in response to the request in step S703. The push response transmitted at this time is a response transmitted using the stream reserved by the temporary response including the PUSH_PROMISE frame in step S802, and indicates completion of processing corresponding to the request. The push response may include data relating to a result of the processing corresponding to the request.

Thus, when a stream reservation request is transmitted from the server apparatus 110 to the client apparatus 120 as the temporary response and a push response is transmitted as the complete response, the same effects as those obtained when the communication sequence illustrated in FIG. 7 is executed can be obtained. More specifically, by receiving the stream reservation request, the client apparatus 120 can determine that the request has been received by the server apparatus 110. Further, by receiving the push response, the client apparatus 120 can determine that the processing requested by the HTTP request is completed by the server apparatus 110. Using this method, the server apparatus 110 can transmit the complete response at a more flexible timing.

Figure 9:
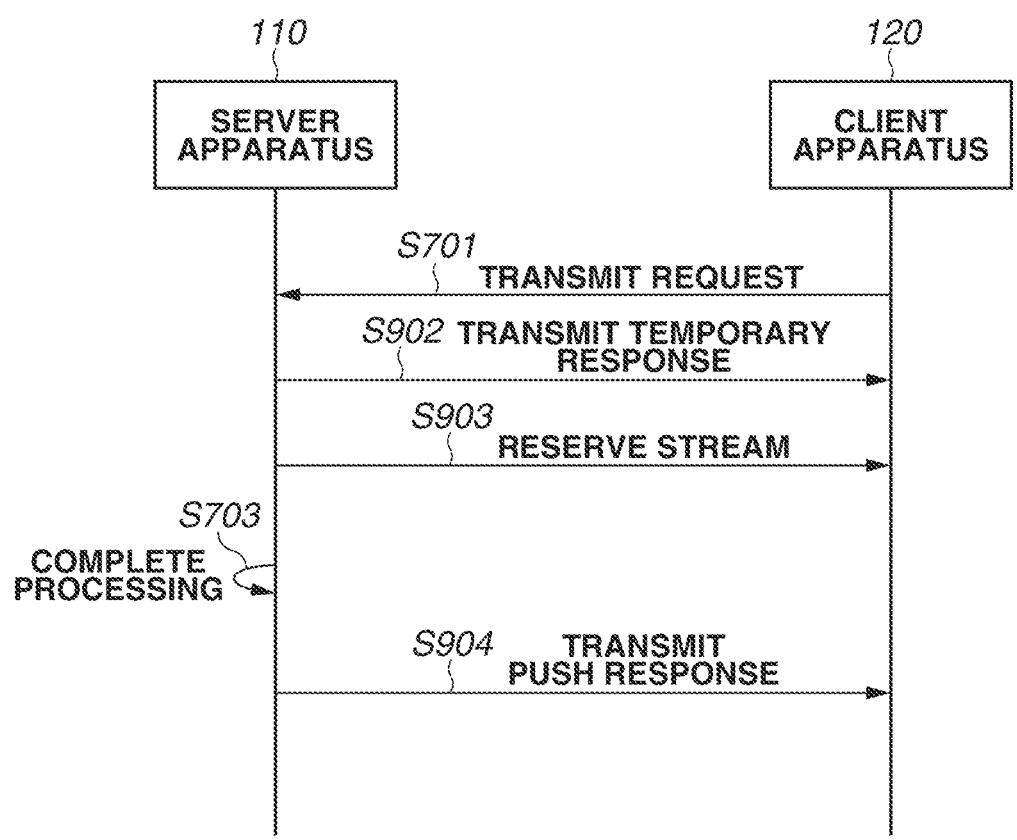
FIG. 9 is a sequence diagram illustrating an example of a sequence for communication between the server apparatus and the client apparatus according to one embodiment.

FIG. 9 illustrates another example of the communication sequence using Server Push in HTTP/2. Processes similar to the processes in the sequence described above with reference to FIG. 7 are denoted by the same reference symbols. In step S902, the server apparatus 110 transmits the HTTP response including the status code of 100 Continue in response to the reception of the HTTP request in step S701 as the temporary response. After that, in step S903, the server apparatus 110 transmits the PUSH_PROMISE frame to the client apparatus 120, thereby reserving a stream. In step S904, the server apparatus 110 transmits the push response to the client apparatus 120 by using the reserved stream, thereby notifying the client apparatus 120 of the completion of the processing in step S703.

In the communication sequence as described above, the same effects as those obtained when the communication sequence illustrated in FIG. 7 is executed can be obtained. More specifically, by receiving the HTTP response including the status code of 100 Continue, the client apparatus 120 can determine that the HTTP request has been received by the server apparatus 110. By receiving the push response, the client apparatus 120 can determine that the processing requested by the HTTP request is completed by the server apparatus 110.

Although FIGS. 8 and 9 illustrate an example where the push response is transmitted as the complete response, the server apparatus 110 may also transmit the complete response separately from the push response when the Server Push in HTTP/2 is used. More specifically, the server apparatus 110 may transmit the PUSH_PROMISE frame as the temporary response to the client apparatus 120, transmit the push response using the reserved stream, and transmit the complete response. The complete response transmitted at this time is, for example, the HTTP response including the status code of 200 OK.

As described above, the server apparatus 110 according to the present exemplary embodiment communicates with the client apparatus 120 in accordance with HTTP. More specifically, the server apparatus 110 receives, from the client apparatus 120, the HTTP request for requesting the server apparatus 110 to perform processing. The HTTP request includes identification information for identifying the requested processing. Further, the server apparatus 110 determines whether to transmit a second response to the client apparatus 120 during a period from reception of the HTTP request to transmission of a first response indicating completion of the processing requested by the HTTP request. This determination is made based on the identification information included in the HTTP request. Then, the server apparatus 110 transmits the first response and the second response to the client apparatus 120 based on the determination.

By using this configuration, it is possible to reduce a time required for the client apparatus 120 to determine that the client apparatus 120 has transmitted a request to the server apparatus 110 and the server apparatus 110 has received the request. Accordingly, it is possible to prevent such a state in which the client apparatus 120 waits for a response when the server apparatus 110 has not correctly received the request. Thus, efficient communication with a reduced delay can be implemented. Further, the processing load on the client apparatus 120 can be reduced as compared with a case where the client apparatus 120 separately transmits a request for making an inquiry to check whether the response is received by the server apparatus 110.

As described above with reference to FIGS. 7 to 9, the server apparatus 110 according to the present exemplary embodiment uses messages in formats defined in HTTP (including HTTP/2) by the method other than a method of the related art, thereby implementing the temporary response and the complete response. Thus, the server apparatus 110 can transmit two types of responses to a single request in accordance with the HTTP communication method in which a request and a response are used on a one-to-one basis. Further, even if the client apparatus 120 has no function for recognizing a non-standard or special command, the server apparatus 110 can notify the client apparatus 120 of the reception of a request or the completion of processing as long as the server apparatus 110 is compatible with the HTTP communication.

In the exemplary embodiment described above, there has been mainly described the case where the complete response is transmitted when the server apparatus 110 has completed the processing requested by the HTTP request received from the client apparatus 120. However, the present invention is not limited thereto. The server apparatus 110 may transmit the complete response when another processing that is associated with the HTTP request received from the client apparatus 120 and is different from the processing requested by the HTTP request is completed. This case will be described in detail below by way of example.

Figure 10:
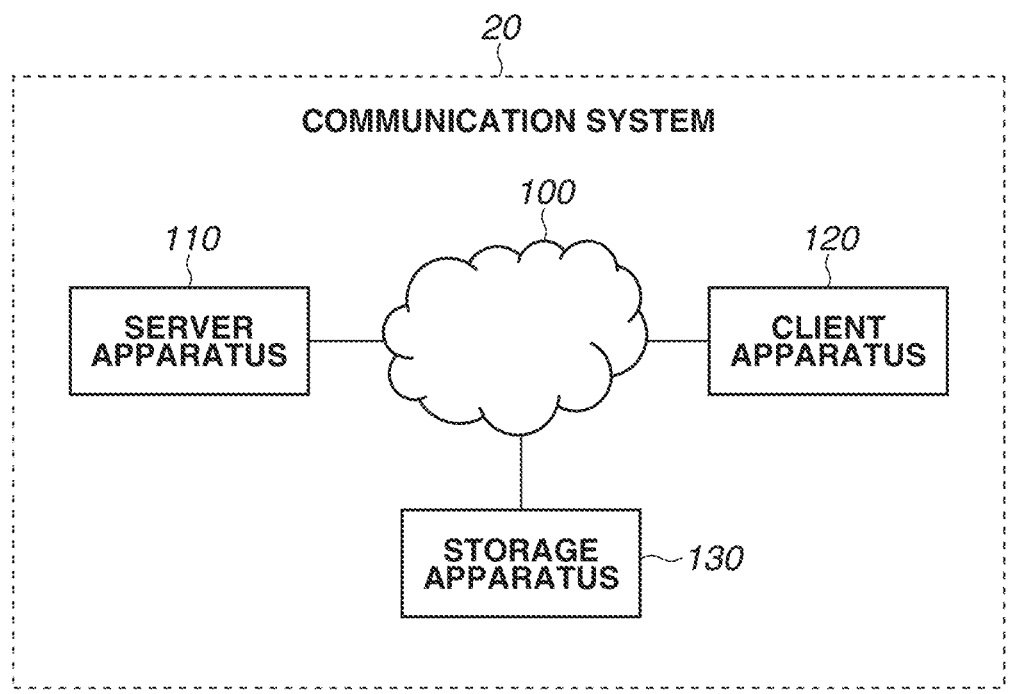
FIG. 10 illustrates a configuration example of a communication system according to one embodiment.

FIG. 10 illustrates a configuration of a communication system 20 as a modification of the communication system 10. In the communication system 20, a storage apparatus 130 is connected to the network 100 in addition to the configuration of the communication system 10 illustrated in FIG. 1. The storage apparatus 130 is an apparatus that can store content such as an image and audio and can communicate with the server apparatus 110 and the client apparatus 120 via the network 100.

Figure 11:
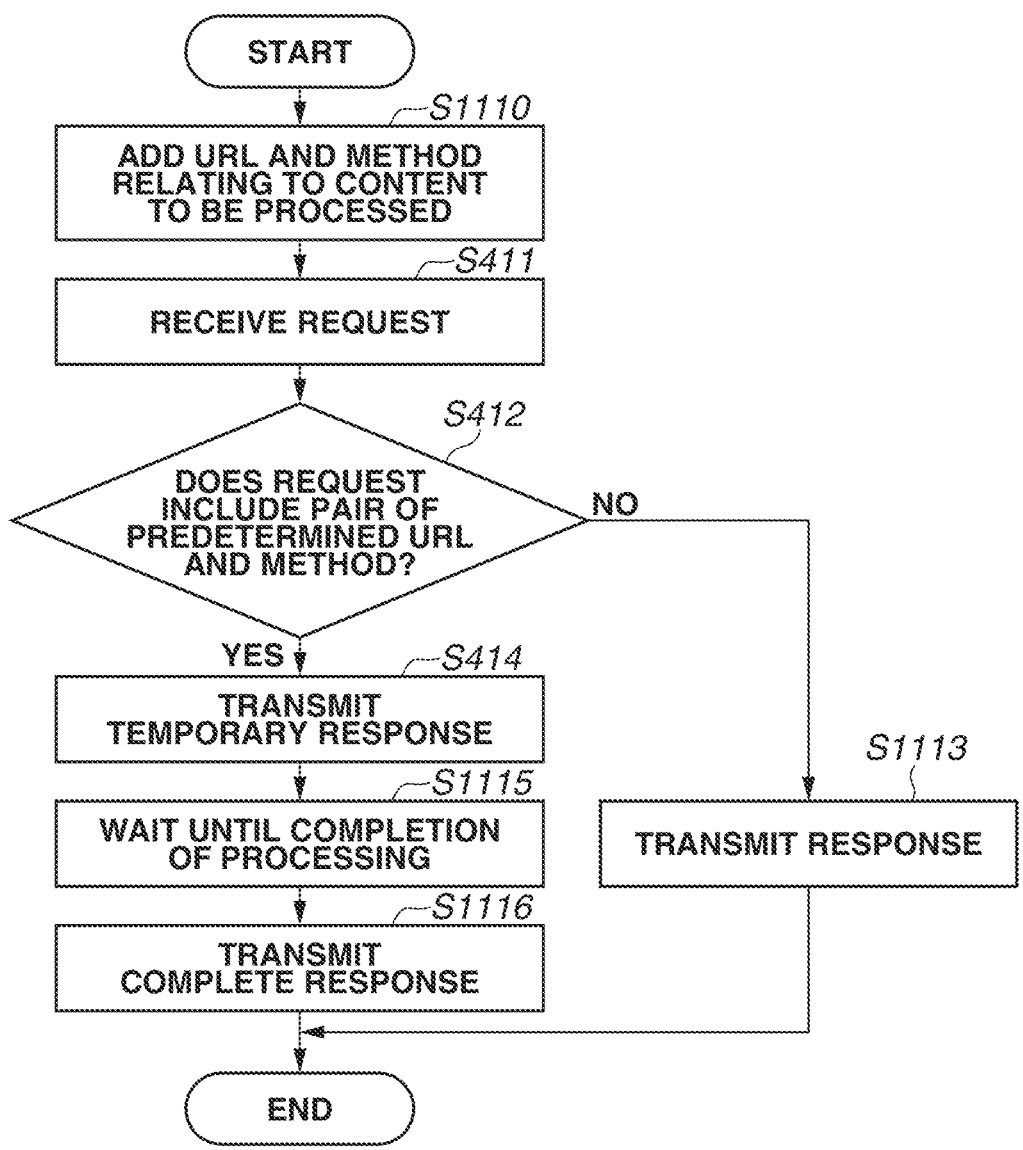
FIG. 11 is a flowchart illustrating an operation of the server apparatus according to one embodiment.

FIG. 11 is a flowchart illustrating an operation of the server apparatus 110 in the communication system 20. Processing illustrated in FIG. 11 is implemented in such a manner that the CPU 201 of the server apparatus 110 loads a program stored in the ROM 202 to the RAM 203 and executes the program. At least a part of the processing described below may be implemented by dedicated hardware other than the CPU 201. The processing illustrated in FIG. 11 is executed at a timing when a connection such as an HTTP connection is established between the server apparatus 110 and the client apparatus 120 and the processing unit 213 of the server apparatus 110 starts predetermined processing. A case where the predetermined processing is processing of transmitting moving image data from the server apparatus 110 to the storage apparatus 130 will be mainly described below. However, content of the predetermined processing is not limited to this example. In addition, the timing for starting the processing illustrated in FIG. 11 is not limited to this timing. Differences between the processing flow illustrated in FIG. 4 and the processing flow illustrated in FIG. 11 will be mainly described below.

In step S110, the information holding unit 216 newly stores the identification information corresponding to the HTTP request for requesting another processing that requires access to the content on which the predetermined processing is being executed by the processing unit 213. For example, if the predetermined processing being executed is processing of transmitting moving image data to the storage apparatus 130, the information holding unit 216 newly stores identification information corresponding to the processing of transmitting moving image data to the client apparatus 120 and identification information corresponding to processing of deleting the moving image data. Specific examples of the identification information stored in this case will be described below with reference to FIG. 12.

The predetermined processing executed by the processing unit 213 is not limited to the transmission of moving image data and may also be processing of transmitting content such as media data other than moving images, application data for operating an application, and log data indicating an operation history of an apparatus. The predetermined processing is not limited to the processing of transmitting the content and may also be processing of converting the content such as encoding, decoding, and editing of the content. The predetermined processing may also be processing of generating the content such as moving image capturing for generating moving image data.

In steps S411 and S412, similar to the processing described above with reference to FIG. 4, the server apparatus 110 receives the HTTP request from the client apparatus 120, and determines whether the request includes information that matches the identification information held by the information holding unit 216. If the determination result in step S412 is "YES", the processing proceeds to step S414. The case where the processing proceeds to step S414 is, for example, a case where the content requested by the HTTP request matches the content being transmitted from the processing unit 213 to the storage apparatus 130. On the other hand, if the determination result in step S412 is "NO", the processing proceeds to step S1113. If the processing proceeds to step S1113, the complete response transmission unit 215 transmits the response corresponding to the request to the client apparatus 120, and the processing illustrated in FIG. 11 is terminated.

In step S414, the temporary response transmission unit 214 transmits the temporary response to the client apparatus 120 in response to the reception of the HTTP request in step S411. This temporary response may include information indicating that the processing unit 213 is executing the predetermined processing. In step S1115, the complete response transmission unit 215 waits until completion of the predetermined processing being executed by the processing unit 213. In step S1116, the complete response transmission unit 215 transmits a complete response to the client apparatus 120. This complete response may include information indicating completion of the predetermined processing by the processing unit 213. The complete response may also include information indicating a result of the predetermined processing such as information about the storage apparatus 130, which is a transmission destination of a content. If the predetermined processing performed by the processing unit 213 is interrupted, the error response may be transmitted instead of the complete response.

In step S1110, the information holding unit 216 may newly store the identification information only when the predetermined processing being executed by the processing unit 213 is processing requiring a period of time longer than the predetermined time length. More specifically, in a case where the moving image data being transmitted by the processing unit 213 is longer than the predetermined time length or is larger than a predetermined data size, the information holding unit 216 may newly store the identification information corresponding to processing of requesting acquisition or deletion of the moving image data. In any other cases, there is no need to newly store the identification information corresponding to the processing of requesting acquisition or deletion of the moving image data.

FIG. 12 illustrates an example of the identification information newly stored in the information holding unit 216 in step S1110. In this case, the processing being executed by the processing unit 213 is processing of transmitting MOVING IMAGE DATA 1.mpg to the storage apparatus 130. Identification information in an entry 1201 is a pair of a URL and a method that correspond to a request for transmitting the MOVING IMAGE DATA 1.mpg. Identification information in an entry 1202 is a pair of a URL and a method that correspond to a request for deleting the moving image data included in the server apparatus 110. For example, the HTTP request for requesting deletion of the MOVING IMAGE DATA 1.mpg includes a URL of http://xxx/del?no=1 and information indicating the POST method. The identification information newly stored in step S1110 is not limited to these examples. Any identification information may be stored as long as the identification information corresponds to a request that requires access to the content on which the processing is being executed by the processing unit 213.

Figure 13:
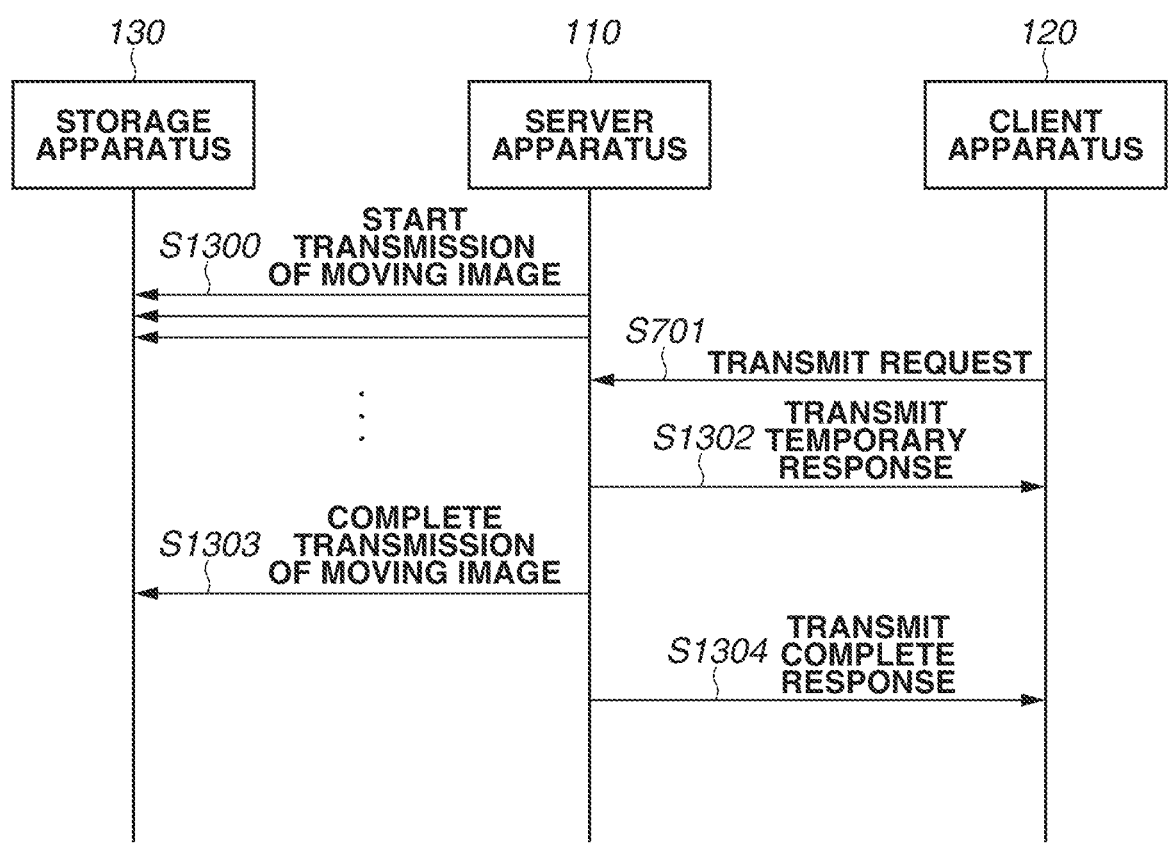
FIG. 13 is a sequence diagram illustrating an example of a sequence for communication in the communication system according to one embodiment.

FIG. 13 illustrates an example of a communication sequence executed in the communication system 20. The server apparatus 110 and the client apparatus 120 execute the operations described above with reference to FIGS. 6 and 11, thereby implementing the communication sequence illustrated in FIG. 13. In step S1300, the processing unit 213 of the server apparatus 110 starts transmission of moving image data to the storage apparatus 130. In step S701, the request transmission unit 321 of the client apparatus 120 transmits the HTTP request for requesting moving image data being transmitted from the server apparatus 110 to the storage apparatus 130, and the server apparatus 110 receives the HTTP request. In step S1302, the temporary response transmission unit 214 of the server apparatus 110 transmits the temporary response corresponding to the HTTP request in step S701 to the client apparatus 120. The temporary response to be transmitted may be, for example, the HTTP response including the status code of 100 Continue, the PUSH_PROMISE frame, or the header of the HTTP response.

In step S1303, the processing unit 213 of the server apparatus 110 completes the transmission of the moving image data started in step S1300. After completion of the transmission, in step S1304, the complete response transmission unit 215 of the server apparatus 110 transmits a complete response corresponding to the HTTP request in step S701 to the client apparatus 120. The complete response may be the HTTP response including the status code of 200 OK, the push message, or the body of the HTTP response. The server apparatus 110 may also transmit, to the client apparatus 120, the moving image data requested by the HTTP request in step S701 as the complete response.

The complete response transmitted in step S1304 may be an HTTP response including a status code of 308 Permanent Redirect that prompts access to the storage apparatus 130, which is the transmission destination of the moving image data by the processing unit 213. If the status code is 308 Permanent Redirect, the complete response may include a URL indicating the location of the moving image data within the storage apparatus 130. Then, the client apparatus 120 that has received the complete response may transmit a request for requesting the moving image data to the storage apparatus 130 and acquire the moving image data.

The transmission of the content to the client apparatus 120 is executed not by the server apparatus 110 but by the storage apparatus 130 as described above, thereby reducing the processing load on the server apparatus 110. When communication performance of the storage apparatus 130 is higher than that of the server apparatus 110, for example, when the server apparatus 110 is a digital camera and the storage apparatus 130 is a PC connected to a high-speed network, a time required for transmitting the moving image data to the client apparatus 120 can be reduced as well.

As described above, the server apparatus 110 receives the HTTP request for requesting the server apparatus 110 to send the content from the client apparatus 120. Then, the server apparatus 110 transmits the first response corresponding to the HTTP request to the client apparatus 120 when the server apparatus 110 is executing the predetermined processing on the content requested by the received HTTP request. Furthermore, the server apparatus 110 transmits the second response corresponding to the HTTP request to the client apparatus 120 after completion of the predetermined processing.

Thus, in a case where the response corresponding to the request transmitted from the client apparatus 120 is delayed due to other processing being executed by the server apparatus 110, the client apparatus 120 can promptly determine the request reception status in the server apparatus 110.

While the present exemplary embodiment describes a case where the server apparatus 110 and the client apparatus 120 perform communication in accordance with HTTP, the communication method is not limited thereto. For example, the present exemplary embodiment can also be applied to a case where communication is performed in accordance with a protocol using HTTP semantics such as Constrained Application Protocol (CoAP).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-229878, filed Nov. 30, 2017, which is hereby incorporated by reference herein in its entirety.

What is claimed is:

1. A first communication apparatus comprising:
one or more processors; and
one or more memories storing instructions that, when executed by the one or more processors, cause the first communication apparatus to:
receive, from a second communication apparatus, a Hypertext Transfer Protocol (HTTP) request for requesting the first communication apparatus to perform processing, the HTTP request including identification information for identifying the requested processing, the identification information comprising a Uniform Resource Locator (URL) for identifying the requested processing and a method of the HTTP request;
determine that the identification information included in the HTTP request matches predetermined identification information held by an information storage;
transmit a preliminary response to the second communication apparatus, the preliminary response transmitted after the reception of the HTTP request and prior to transmission of a completion response,
wherein:
the first communication apparatus determines to transmit the preliminary response to the second communication apparatus based on the URL identifying processing of changing a zoom factor or a direction of image capturing,
the preliminary response includes a header of an HTTP response,
the completion response is a body of the HTTP response,
the preliminary response is transmitted based on it being determined that the identification information included in the HTTP request matches the predetermined identification information held by the information storage, and
the completion response indicates completion of the processing requested by the HTTP request; and
transmit the completion response to the second communication apparatus.

2. The first communication apparatus according to claim 1, wherein in a case where the first communication apparatus determines that the identification information included in the HTTP request does not match the predetermined identification information held by the information storage; the first communication apparatus transmits the completion response to the second communication apparatus but does not transmit the preliminary response to the second communication apparatus.

3. The communication apparatus according to claim 1, wherein the first communication apparatus transmits the completion response after completion of the processing requested by the HTTP request.

4. The first communication apparatus according to claim 1, wherein the first communication apparatus determines to transmit the preliminary response to the second communication apparatus based on the URL identifying any of processing of continuously capturing a still image, processing of capturing a moving image, and processing of converting an image.

5. The first communication apparatus according to claim 1,
wherein the completion response includes any of status codes of 200 to 599, and
wherein the preliminary response includes any of status codes of 100 to 199.

6. The first communication apparatus according to claim 1,
wherein the preliminary response includes a PUSH_PROMISE frame defined in Hypertext Transfer Protocol version 2 (HTTP/2), and
wherein the first communication apparatus transmits the completion response by using a stream reserved by the preliminary response including the PUSH_PROMISE frame.

7. A communication method executed by a first communication apparatus, the communication method comprising:
receiving, from a second communication apparatus, a Hypertext Transfer Protocol (HTTP) request for requesting the first communication apparatus to perform processing, the HTTP request including identification information for identifying the requested processing, the identification information comprising a Uniform Resource Locator (URL) for identifying the requested processing and a method of the HTTP request;
determining that the identification information included in the HTTP request matches predetermined identification information held by an information storage;
transmitting a preliminary response to the second communication apparatus, the preliminary response transmitted after the reception of the HTTP request and prior to transmission of a completion response,
wherein:
the first communication apparatus determines to transmit the preliminary response to the second communication apparatus based on the URL identifying processing of changing a zoom factor or a direction of image capturing,
the preliminary response includes a header of an HTTP response,
the completion response is a body of the HTTP response,
the preliminary response is transmitted based on it being determined that the identification information included in the HTTP request matches the predetermined identification information held by the information storage, and
the completion response indicates completion of the processing requested by the HTTP request; and
transmitting the completion response to the second communication apparatus.

8. The communication method according to claim 7, wherein in a case where the first communication apparatus determines not to transmit the preliminary response to the second communication apparatus, the completion response is transmitted to the second communication apparatus without transmitting the preliminary response.

9. A non-transitory computer-readable storage medium that stores a program for causing a first communication apparatus to execute processing comprising:
receiving, from a second communication apparatus, a Hypertext Transfer Protocol (HTTP) request for requesting the first communication apparatus to perform processing, the HTTP request including identification information for identifying the requested processing, the identification information comprising a Uniform Resource Locator (URL) for identifying the requested processing and a method of the HTTP request;
determining that the identification information included in the HTTP request matches predetermined identification information held by an information storage;

transmitting a preliminary response to the second communication apparatus, the preliminary response transmitted after the reception of the HTTP request and prior to transmission of a completion response,
wherein:
  the first communication apparatus determines to transmit the preliminary response to the second communication apparatus based on the URL identifying processing of changing a zoom factor or a direction of image capturing,
  the preliminary response includes a header of an HTTP response,
  the completion response is a body of the HTTP response,
  the preliminary response is transmitted based on it being determined that the identification information included in the HTTP request matches the predetermined identification information held by the information storage, and
  the completion response indicates completion of the processing requested by the HTTP request, a second response to the second communication apparatus; and
transmitting the completion response to the second communication apparatus.

* * * * *